UNITED STATES PATENT OFFICE.

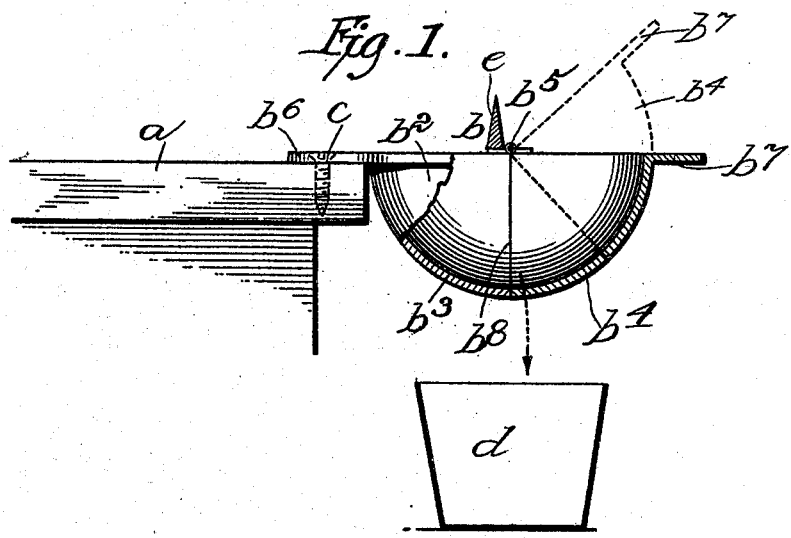
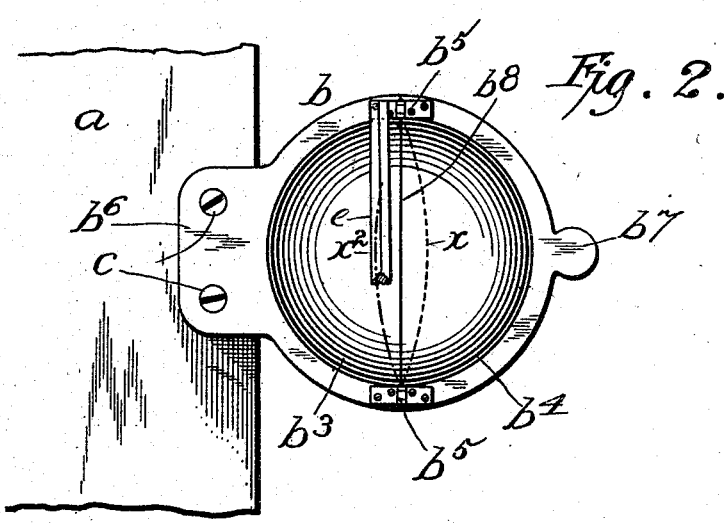

JOHN SAUL, OF JERSEY CITY, NEW JERSEY.

KITCHEN UTENSIL.

939,329.  Specification of Letters Patent.  Patented Nov. 9, 1909.

Application filed February 19, 1909. Serial No. 478,822.

*To all whom it may concern:*

Be it known that I, JOHN SAUL, a citizen of the United States, and residing at Jersey City, in the county of Hudson and State of New Jersey, have invented certain new and useful Improvements in Kitchen Utensils, of which the following is a specification, such as will enable those skilled in the art to which it appertains to make and use the same.

This invention relates to kitchen utensils; and the object thereof is to provide an improved device of this class designed for use as a receiver of broken eggs and from which the eggs may be dropped into any suitable receptacle prepared therefor.

My improved kitchen utensil is designed to be connected with or secured to a table or other support, and the said invention is fully disclosed in the following specification, of which the accompanying drawing forms a part, in which the separate parts of my improvement are designated by suitable reference characters in each of the views, and in which;—

Figure 1 is a side view of my improved kitchen utensil partly in section, and showing the same secured to a table or other support, and;—Fig. 2 a plan view thereof.

In the drawing forming part of this specification, I have shown at $a$ a table or support to which my improved kitchen utensil $b$ is secured. The kitchen utensil $b$ consists of a bowl-shaped receptacle $b^2$ which is semi-spherical in form, and the parts $b^3$ and $b^4$ are hinged together at the top of the side portions thereof as shown at $b^5$, and one of the parts of the receptacle $b^2$ is provided with a flange or rim member $b^6$ by which it is secured to the table or support $a$, screws or other devices $c$ being employed for this purpose, and the other part of the receptacle is provided opposite the flange or rim member $b^6$ with a flange projection $b^7$ which forms a handle for said part, and by means of which said part may be raised as indicated in dotted lines in Fig. 1.

In practice the eggs are broken and dropped into the receptacle $b^2$, and from this receptacle they are dumped into a bucket or any suitable receiver $d$ placed below the device and supported in any desired manner.

With this device any number of eggs may be broken into the receptacle $b^2$ and then dumped into the receiver $d$, or the eggs may be dumped as broken, and if a bad egg is dropped into the receptacle $b^2$ it may be dumped therefrom into a supplemental receiver or cup and not dropped into the main receiver $d$. I also preferably place transversely of the stationary part of the receptacle and preferably at the front edge thereof a blade-shaped device $e$ on which the eggs may be broken, and this device may be mounted loosely on the receptacle or secured thereto in any desired manner.

In the accompanying drawing the receptacle $b^2$ is divided into two approximately equal parts, but the line of division at $b^8$ may be changed to the dotted position indicated at $x$ in Fig. 2, or to that indicated at $x^2$ if desired.

Having fully described my invention, what I claim as new and desire to secure by Letters Patent, is:—

1. A device of the class described comprising a bowl-shaped receptacle divided transversely into two parts hinged together at the top of the side portions thereof, one of said parts being adapted to be secured to a support and the other being provided with a handle.

2. A device of the class described comprising a bowl-shaped receptacle divided transversely into two parts hinged together at the top of the side portions thereof, one of said parts being adapted to be secured to a support and the other being provided with a handle, that part which is adapted to be secured to a support being also provided with a transverse blade member the edge of which is directed upwardly.

In testimony that I claim the foregoing as my invention I have signed my name in presence of the subscribing witnesses this 17th day of February 1909.

JOHN SAUL.

Witnesses:
C. E. MULREANY,
HARRY R. CANFIELD.